United States Patent
Kure et al.

(10) Patent No.: US 8,483,922 B2
(45) Date of Patent: Jul. 9, 2013

(54) WORK VEHICLE AND METHOD FOR CONTROLLING WORK VEHICLE

(75) Inventors: Kazuki Kure, Ibaraki (JP); Kazuyuki Suzuki, Hirakata (JP); Shigeru Yamamoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 649 days.

(21) Appl. No.: 12/667,982

(22) PCT Filed: Sep. 3, 2008

(86) PCT No.: PCT/JP2008/065854
§ 371 (c)(1),
(2), (4) Date: Jan. 6, 2010

(87) PCT Pub. No.: WO2009/034890
PCT Pub. Date: Mar. 19, 2009

(65) Prior Publication Data
US 2010/0198472 A1    Aug. 5, 2010

(30) Foreign Application Priority Data
Sep. 10, 2007  (JP) ................. 2007-234131

(51) Int. Cl.
| | | |
|---|---|---|
| G06F 7/70 | (2006.01) |
| G06F 17/00 | (2006.01) |
| F16D 65/78 | (2006.01) |
| F16D 65/00 | (2006.01) |
| F16D 13/72 | (2006.01) |
| F16D 13/00 | (2006.01) |
| F16D 11/04 | (2006.01) |
| B60T 8/36 | (2006.01) |
| B60T 8/66 | (2006.01) |
| B60W 10/10 | (2012.01) |

(52) U.S. Cl.
USPC .............. 701/70; 701/78; 701/83; 188/264 R; 188/264 B; 303/119.1; 303/166; 303/167; 192/70.12; 192/113.1; 192/113.3; 192/144; 192/219

(58) Field of Classification Search
USPC ................. 701/70, 78, 83; 188/264 R, 264 B; 303/119.1, 166, 167; 192/70.12, 113.1–113.3, 192/144, 219
See application file for complete search history.

(56) References Cited

U.S. PATENT DOCUMENTS
4,205,739 A    6/1980  Shelby et al.
4,538,228 A *  8/1985  Brearey et al. ................. 701/70
(Continued)

FOREIGN PATENT DOCUMENTS
JP    53-34054 A    3/1978
JP    04-71829 U    6/1992
(Continued)

*Primary Examiner* — James Trammell
*Assistant Examiner* — Majdi Alsomiri
(74) *Attorney, Agent, or Firm* — Global IP Counselors, LLP

(57) ABSTRACT

The work vehicle includes a braking device, a lubricant feeding section, and a controlling section. The controlling section configured to execute a first control in which an amount of the lubricant fed to the braking device is controlled based on a temperature of a rotating member of the braking device. The controlling section sets the amount of the lubricant to a predetermined first feed amount when the braking device is in a braking state, calculates the temperature of the rotating member, and makes a decision in the first control, based on the calculated temperature of the rotating member, to change the amount of the lubricant from the first feed amount to a second feed amount, which is smaller than the first feed amount, when the braking device is switched from the braking state to a non-braking state.

7 Claims, 5 Drawing Sheets

U.S. PATENT DOCUMENTS

| | | | |
|---|---|---|---|
| 4,685,745 A * | 8/1987 | Reinecke | 303/191 |
| 5,443,306 A * | 8/1995 | Broome | 303/3 |
| 5,462,343 A * | 10/1995 | Yoshida et al. | 303/114.1 |
| 5,669,678 A * | 9/1997 | Stumpe et al. | 303/155 |
| 5,806,938 A * | 9/1998 | Stumpe et al. | 303/155 |
| 6,254,203 B1 * | 7/2001 | Arnold | 303/177 |
| 6,755,487 B2 * | 6/2004 | Suzuki et al. | 303/121 |
| 6,913,328 B2 * | 7/2005 | Eckert et al. | 303/191 |
| 6,938,471 B2 * | 9/2005 | Nakano | 73/168 |
| 7,168,771 B2 * | 1/2007 | Nakano | 303/191 |
| 7,640,078 B2 * | 12/2009 | Smirnov | 700/282 |
| 2008/0150352 A1 * | 6/2008 | Nakamura et al. | 303/20 |

FOREIGN PATENT DOCUMENTS

| | | |
|---|---|---|
| JP | 11-72129 A | 3/1999 |
| JP | 2001-39280 A | 2/2001 |
| JP | 2007-216944 A | 8/2007 |

* cited by examiner

WORK VEHICLE AND METHOD FOR CONTROLLING WORK VEHICLE

CROSS-REFERENCE TO RELATED APPLICATIONS

This national phase application claims priority to Japanese Patent Application No. 2007-234131, filed on Sep. 10, 2007. The entire disclosure of Japanese Patent Application No. 2007-234131 is hereby incorporated herein by reference.

TECHNICAL FIELD

The present invention relates to a work vehicle and a method for controlling the work vehicle.

BACKGROUND ART

In a braking device for pressing a rotating member that rotates together with an output shaft against a fixed member fixed to a vehicle body to generate a braking force, the rotating member generates heat due to friction. Therefore, a lubricant is applied between the rotating member and the fixed member, thereby cooling the rotating member and suppressing increase in temperature of the rotating member.

In an instance where there is a large amount of lubricant between the rotating member and the fixed member, there is a possibility that a part of the driving force of the output shaft may be transferred from the rotating member to the lubricant, resulting in a loss of driving force, even when the braking device is in a non-braking state in which the rotating member and the non-rotating member are not pressed against each other.

In order to prevent such a loss of driving force, a lubricant circuit that increases the amount of supplied lubricant when the braking device is in a braking state, and decreases the feed amount when the braking device is in a non-braking state, is provided according to a technique described in Japanese Laid-open Patent Application No. 53-034054.

SUMMARY OF THE INVENTION

However, in a braking device, there may be instances where the temperature of the rotating member has not decreased sufficiently when the braking device is switched from a braking state to a non-braking state. In such an instance, if the amount of supplied lubricant is switched according to the braking device being switched between braking and non-braking states as described above, there is a possibility of the amount of supplied lubricant being reduced even in a state in which the temperature of the rotating member is high, and the rotating member overheating. In order to prevent such overheating, the amount of supplied lubricant must be set high; in such an instance, the effect of minimizing the loss of driving force is reduced.

An object of the present invention is to provide a work vehicle and a method for controlling the work vehicle enabling a braking device to have minimal loss of driving force, to experience a minimal number of instances of overheating.

A work vehicle according to a first aspect of the present invention includes a braking device, a lubricant feeding section, and a controlling section. The braking device is configured and arranged to press a rotating member that rotates together with an output shaft against a fixed member fixed to a vehicle body to generate a braking force. The lubricant feeding section is configured and arranged to feed a lubricant to the braking device so that the rotating member is cooled by the lubricant. The controlling section is configured to execute a first control in which an amount of supplied lubricant fed to the braking device is controlled according to a temperature of the rotating member. The controlling section is further configured to set the amount of the lubricant to a predetermined first feed amount when the braking device is in a braking state, and in the first control to calculate the temperature of the rotating member and to make a decision based on the calculated temperature of the rotating member to change the amount of the lubricant from the first feed amount to a second feed amount that is smaller than the first feed amount when the braking device is switched from the braking state to a non-braking state. Here, the braking state is a state in which the rotating member and the fixed member are pressed against each other, thereby generating the braking force.

In the work vehicle according to the first aspect, a relatively large first amount of supplied lubricant is fed to the braking device when the braking device is in the braking state. A high cooling capacity can be thereby obtained. When the braking device is switched from the braking state to the non-braking state, the amount of supplied lubricant is not always reduced to the second feed amount; rather, a decision is made in the first control, based on the temperature of the rotating member, to change the amount of supplied lubricant from the first feed amount to the second feed amount. Accordingly, the first feed amount can be maintained when the temperature of the rotating member has not sufficiently decreased, and reduced to the second feed amount when the temperature of the rotating member has sufficiently decreased. Accordingly, loss of driving force in the braking device can be suppressed to a greater extent than when a large amount of the lubricant is always fed to the braking device. Moreover, the rotating member can be cooled appropriately and the incidence of overheating can be reduced to a greater extent than when the feed amount is increased or decreased according to the braking device being switched between braking and non-braking states.

Moreover, the temperature of the rotating member is computationally determined, instead of being detected directly using detecting means such as a sensor. Accordingly, there is no need to provide a temperature sensor durable enough to withstand the movement of the rotating member, and the braking device can be constructed inexpensively.

A work vehicle according to a second aspect of the present invention is a work vehicle according to the first aspect of the present invention, wherein the controlling section is configured to reduce the amount of the lubricant from the first feed amount to the second feed amount in the first control when the calculated temperature of the rotating member is lower than a predetermined target temperature.

In the work vehicle according to the second aspect, the amount of supplied lubricant is reduced from the first feed amount to the second feed amount in the first control when the temperature of the rotating member decreases to a temperature that is lower than the predetermined target temperature. Accordingly, the amount of supplied lubricant can be accurately altered according to the temperature of the rotating member.

A work vehicle according to a third aspect of the present invention is a work vehicle according to the first aspect of the present invention, wherein the controlling section is configured to calculate a lubricant feed time required for the temperature of the rotating member to decrease to a predetermined target temperature as a result of the lubricant being fed at the first feed amount in the first control when the braking device is switched from the braking state to the non-braking state, and to reduce the amount of the lubricant from the first feed amount to the second feed amount when the lubricant feed time has elapsed from a point in time when the braking device is switched from the braking state to the non-braking state.

In the work vehicle according to the third aspect, when the braking device is switched from the braking state to the non-braking state, the lubricant is fed in the first control at the first feed amount until the lubricant feed time has elapsed. Accordingly, the rotating member can be cooled with a high cooling capacity, even when the braking device is in the non-braking state. Also, when the lubricant feed time has elapsed, the amount of supplied lubricant is reduced from the first feed amount to the second feed amount, thereby making it possible to minimize the loss of driving force in the braking device.

A work vehicle according to a fourth aspect of the present invention is a work vehicle according to the third aspect of the present invention, wherein, when the braking device is switched from the non-braking state to the braking state before the lubricant feed time has elapsed from the point in time when the braking device is switched from the braking state to the non-braking state, the controlling section is configured to recalculate the lubricant feed time in the first control, from a subsequent point in time when the braking device is switched from the braking state to the non-braking state.

In the work vehicle according to the fourth aspect, when the braking device is switched to the braking state while in a state in which the temperature of the rotating member has not sufficiently decreased, the lubricant feed time from the point in time when the brake device is switched from the braking state to the non-braking state is subsequently re-calculated. Accordingly, the rotating member can be sufficiently cooled, even when a braking operation is repeatedly applied intermittently.

A work vehicle according to a fifth aspect of the present invention is a work vehicle according to the first aspect of the present invention, further comprising a transmission configured and arranged to convert driving force transmitted to the output shaft. The controlling section is configured to execute the first control when the gear position of the transmission is at a predetermined high-speed gear position, and to execute a second control, in which a predetermined amount of the lubricant is fed to the braking device irrespective of the temperature of the rotating member and the braking/non-braking states of the braking device, when the gear position of the transmission is at a low-speed gear position having a greater transmission gear ratio than the high-speed gear position.

In the work vehicle according to the fifth aspect, the first control is executable when the gear position of the transmission is at a high-speed gear position at which loss of driving force is relatively large. Accordingly, the effect of minimizing the loss of driving force can be further enhanced. When the gear position of the transmission is at a low-speed gear position at which loss of driving force is relatively small, the second control is executed. In the second control, a predetermined amount of the lubricant is fed to the breaking device irrespective of the temperature of the rotating member and the braking/non-braking states of the braking device, thereby allowing the capacity for cooling the rotating member to increase.

A work vehicle according to a sixth aspect of the present invention is a work vehicle according to the first aspect of the present invention, further comprising a rotating speed detector configured and arranged to detect a rotating speed of the rotating member. The controlling section is configured to execute the first control when the rotating speed of the rotating member exceeds a predetermined value, and to execute a second control, in which a predetermined amount of the lubricant is fed to the braking device irrespective of the temperature of the rotating member and the braking/non-braking states of the braking device, when the rotating speed of the rotating member is equal to or less than the predetermined value.

In the work vehicle according to the sixth aspect, the first control is executable when the rotating speed of the rotating member is relatively high. Accordingly, the effect of minimizing the loss of driving force can be further enhanced. When the rotating speed of the rotating member is relatively low, the second control is executed. In the second control, a predetermined amount of the lubricant is fed to the breaking device irrespective of the temperature of the rotating member and the braking/non-braking states of the braking device, thereby allowing the capacity for cooling the rotating member to increase.

A work vehicle according to a seventh aspect of the present invention comprises a braking device, a lubricant feeding section, and a controlling section. The braking device is configured and arranged to press a rotating member that rotates together with an output shaft against a fixed member fixed to a vehicle body to generate a braking force. The lubricant feeding section is configured and arranged to feed a lubricant to the braking device so that the rotating member is cooled by the lubricant. The controlling section is configured to execute a first control in which an amount of the lubricant fed to the braking device is controlled according to a temperature of the fixed member. The controlling section is configured to set the amount of the lubricant to a predetermined first feed amount when the braking device is in a braking state, and in the first control to calculate the temperature of the fixed member and to make a decision based on the calculated temperature of the fixed member to change the amount of the lubricant from the first feed amount to a second feed amount that is smaller than the first feed amount when the braking device is switched from the braking state to a non-braking state. Here, the braking state is a state in which the rotating member and the fixed member are pressed against each other, thereby generating a braking force.

In the work vehicle according to the seventh aspect, a relatively large first amount of supplied lubricant is fed to the braking device when the braking device is in the braking state. A high cooling capacity can be thereby obtained. When the braking device is switched from the braking state to the non-braking state, the amount of supplied lubricant is not always reduced to the second feed amount; rather, a decision is made in the first control, based on the temperature of the fixed member to change the amount of supplied lubricant from the first feed amount to the second feed amount. Accordingly, the first feed amount can be maintained when the temperature of the fixed member has not sufficiently decreased, and reduced to the second feed amount when the temperature of the fixed member has sufficiently decreased. Accordingly, loss of driving force in the braking device can be suppressed to a greater extent than when a large amount of the lubricant is always fed to the braking device. Moreover, the rotating member can be cooled appropriately and the incidence of overheating can be reduced to a greater extent than when the feed amount is increased or decreased according to the braking device being switched between braking and non-braking states.

A method for controlling a work vehicle according to a eighth aspect of the present invention is a method for controlling a work vehicle having a braking device that generates a braking force by pressing a rotating member that rotates together with an output shaft against a fixed member fixed to the vehicle body with a lubricant being fed to the braking device to cool the rotating member. The method includes calculating a temperature of the rotating member; and controlling an amount of the lubricant fed to the braking device based on the calculated temperature of the rotating member.

In the method for controlling a work vehicle according to the eighth aspect, the amount of the lubricant fed to the braking device is controlled according to the temperature of the rotating member. Accordingly, loss of driving force in the braking device can be suppressed to a greater extent than when a large amount of the lubricant is always fed to the braking device. Moreover, the rotating member can be cooled appropriately and the incidence of overheating can be reduced to a greater extent than when the feed amount is increased or decreased according to the braking device being switched between braking and non-braking states.

A method for controlling a work vehicle according to a ninth aspect of the present invention is a method for controlling a work vehicle according to the eighth aspect, wherein the controlling of the amount of the lubricant includes setting the amount of the lubricant to a predetermined first feed amount when the braking device is in a braking state in which the rotating member and the fixed member are pressed against each other, and making a decision, based on the calculated temperature of the rotating member, to change the amount of the lubricant from the first feed amount to a second feed amount, which is smaller than the first feed amount, when the braking device is switched from the braking state to a non-braking state.

In the method for controlling a work vehicle according to the tenth aspect, a relatively large first amount of supplied lubricant is fed to the braking device when the braking device is in the braking state. Accordingly, a high cooling capacity can be obtained. When the braking device is switched from the braking state to the non-braking state, the amount of supplied lubricant is not always reduced to the second feed amount; rather, a decision is made, based on the temperature of the rotating member, to change the amount of supplied lubricant from the first feed amount to the second feed amount. Accordingly, the first feed amount can be maintained when the temperature of the rotating member has not sufficiently decreased, and can be reduced to the second feed amount when the temperature of the rotating member has sufficiently decreased. Accordingly, loss of driving force in the braking device can be suppressed to a greater extent than when a large amount of the lubricant is always fed to the braking device. Moreover, the rotating member can be cooled appropriately and the incidence of overheating can be reduced to a greater extent than when the feed amount is increased or decreased according to the braking device being switched between braking and non-braking states.

BEST MODE FOR CARRYING OUT THE INVENTION

First Embodiment

Figure 1:
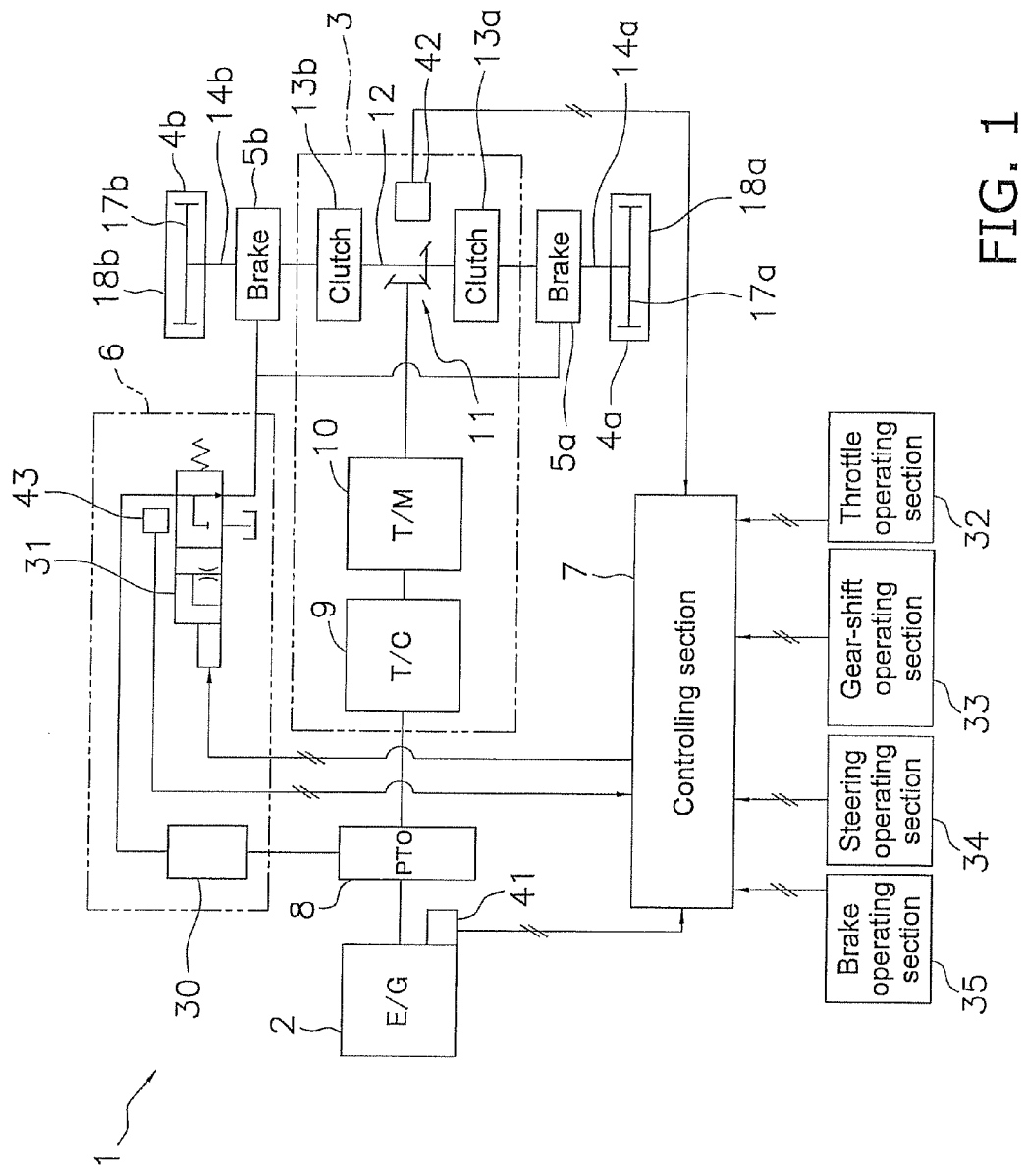
FIG. 1 is a schematic system diagram of a work vehicle.

FIG. 1 is a schematic system diagram of a work vehicle 1 according to a first embodiment of the present invention. The work vehicle 1 is, for example, a bulldozer, and comprises an engine 2; a power transmission mechanism 3; a pair of traveling devices 4a, 4b; a pair of braking devices 5a, 5b; a lubricant feeding section 6; a variety of operating sections 32 through 35; a variety of sensors 41 through 43; a controlling section 7; and other components.

Engine 2

The engine 2 is a diesel engine, the output of which is controlled by adjusting the amount of fuel injected from the fuel injection pump (not shown). Specifically, the engine speed and the amount of fuel injected are adjusted according to load so that the actual engine speed matches the engine speed set by the controlling section 7. A driving force from the engine 2 is distributed via a power takeoff device 8 to the power transmission mechanism 3 and a hydraulic pump 30 described below.

Power Transmission Mechanism 3

The power transmission mechanism 3 is a mechanism for transmitting the driving force from the engine 2 to a pair of traveling devices 4a, 4b, and comprises a torque converter 9; a transmission 10; a bevel gear 11; a horizontal shaft 12; a pair of steering clutches 13a, 13b; and a pair of output shafts 14a, 14b and other components.

The torque converter 9 transmits the driving force from the engine 2 to the transmission 10.

The transmission 10 is a device for converting the driving force transmitted from the engine 2 to the output shafts 14a, 14b, and transmits the driving force from the torque converter 9 to the bevel gear 11. The transmission 10 switches between forward and reverse as a result of being controlled by a control signal from the controlling section 7. The transmission 10 also shifts between gear positions as a result of being controlled by a control signal from the controlling section 7. For example, the transmission 10 is able to shift between first, second, and third forward gears, and first, second, and third reverse gears. The driving force of the engine 2 outputted from the transmission 10 is transmitted to the bevel gear 11.

Figure 2:
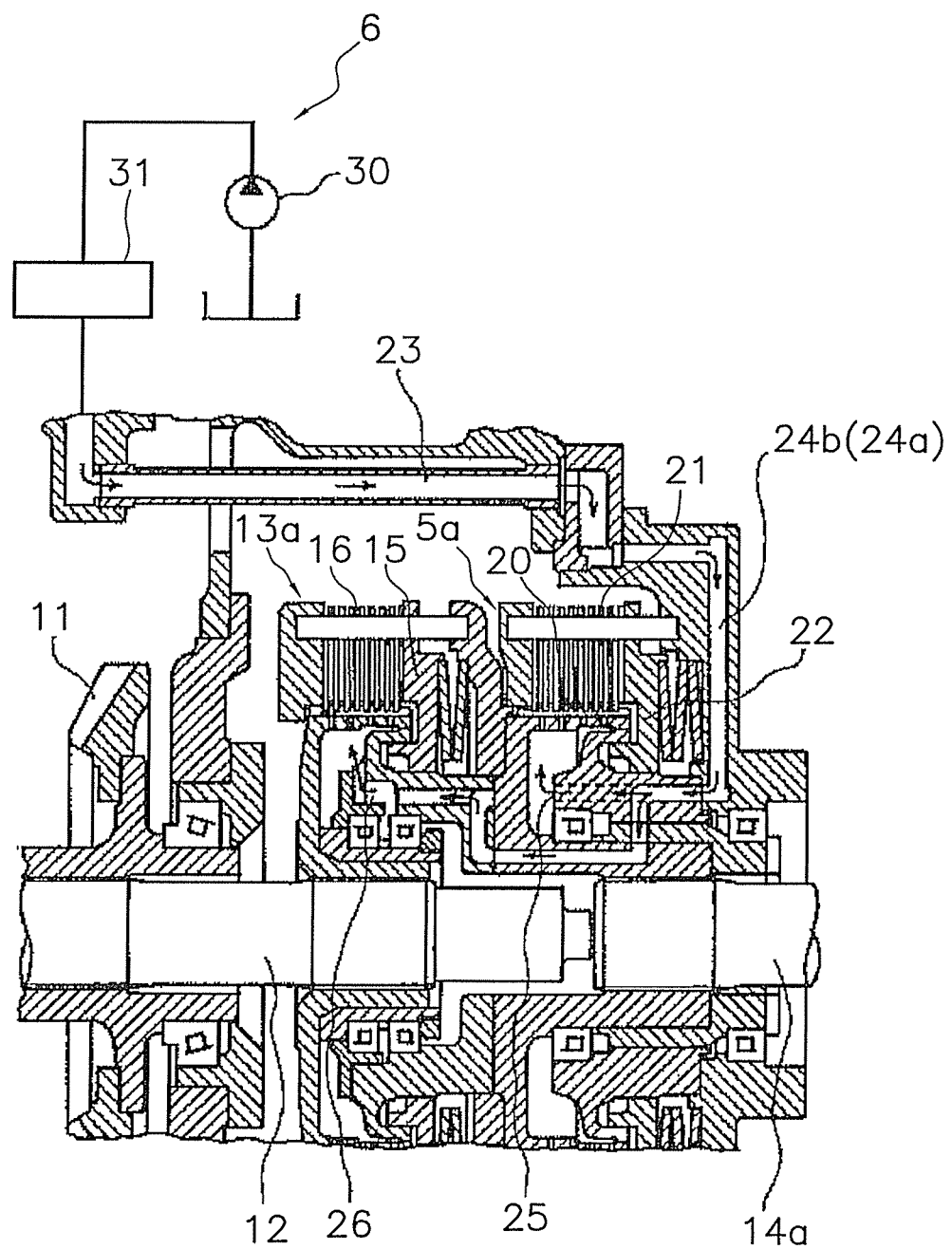
FIG. 2 is a cross-sectional view showing a configuration of a braking device.

As shown in FIG. 2, the driving force that has been transmitted to the bevel gear 11 is transmitted to the output shaft 14a via the horizontal shaft 12 and the steering clutch 13a. The steering clutch 13a is engaged by a clutch piston 15 being pressed against a clutch disc 16 by a disc spring and disengaged when the piston is hydraulically separated. Although FIG. 2 only shows the steering clutch 13a, which is one of a pair of steering clutches 13a, 13b, the other steering clutch 13b has a similar structure. A left-and-right pair of clutches 13a, 13b and a left-and-right pair of braking devices 5a, 5b constitute a steering device of the work vehicle 1.

Traveling Devices 4a, 4b

Each of the pair of traveling devices 4a, 4b has a sprocket wheel 17a, 17b; and a crawler belt 18a, 18b that is wound around the sprocket wheel 17a, 17b. The sprocket wheels 17a, 17b are connected to output shafts 14a, 14b of the power transmission mechanism 3, and the driving force from the engine 2 is transmitted via the power transmission mechanism 3 to each of the sprocket wheels 17a, 17b. When the sprocket wheels 17a, 17b are rotationally driven, the crawler belts 18a, 18b, which are wound around the sprocket wheels 17a, 17b, are driven, and move the work vehicle 1.

Braking Devices 5a, 5b

FIG. 2 shows a structure of the braking device 5a, which is one of the pair of braking devices 5a, 5b. The other braking device 5b has a similar structure. The braking device 5a is a so-called wet multiple disc braking device, comprising a plurality of brake discs 20 (rotating member), a plurality of fixed plates 21 (fixed member), and a brake piston 22. Each of the brake discs 20 is located between the fixed plates 21. Braking force is generated as a result of the plurality of brake discs 20, which rotate with the horizontal shaft 12 and the output shaft 14a, being pressed against the fixed plates 21, which are fixed to the vehicle body. When no hydraulic pressure is being applied to the brake piston 22, the braking device 5a is in a braking state in which the brake discs 20 and the fixed plates 21 are pressed against each other due to an urging force exerted by a disc spring. Applying a hydraulic pressure to the brake piston 22 results in the brake piston 22 countering the urging force exerted by the disc spring, separating the brake discs 20 and fixed plates 21. As a result, the braking device 5a enters a non-braking state.

When the braking device 5a is repeatedly switched between braking and non-braking states, friction heat is generated in the brake discs 20. The brake discs 20 can be lubricated and cooled in the braking device 5a using a lubricant fed from a lubricant feeding section 6 described below. As shown in FIG. 2, the lubricant that is fed from the lubricant feeding section 6 is channeled through a lubricant feed conduit 23 as indicated by the arrows, and branches into two pathways; i.e., a brake feed conduit 24a and a clutch feed conduit 24b. In FIG. 2, the brake feed conduit 24a and the clutch feed conduit 24b are positioned so as to overlap; the brake feed conduit 24a is located behind the clutch feed conduit 24b. The lubricant that is channeled into the brake feed conduit 24a passes through a brake feed port 25 and through gaps between the brake discs 20, and lubricates and cools the brake discs 20. The lubricant that is channeled into the clutch feed conduit 24b passes through a clutch feed port 26 and through gaps between the clutch discs 16, and lubricates and cools the clutch discs 16. The lubricant that has passed through the gaps between the brake discs 20 and the lubricant that has passed through the gaps between the clutch discs 16 is returned to the lubricant feeding section 6 via a return pathway (not shown).

Lubricant Feeding Section 6

As shown in FIG. 1, the lubricant feeding section 6 comprises the hydraulic pump 30 and a flow-rate switching valve 31, and feeds the lubricant to the braking device 5a, 5b.

The hydraulic pump 30 is a fixed displacement pump that is driven by a driving force from the engine 2 transmitted via the power takeoff device 8, and discharges the lubricant for cooling the braking device 5a, 5b.

The flow-rate switching valve 31 is a solenoid valve controlled by a control signal from the controlling section 7, and switches the amount of supplied lubricant being fed to the braking device 5a, 5b. The flow-rate switching valve 31 is switchable between a first state, in which a full amount of the lubricant discharged from the hydraulic pump 30 ("first feed amount" hereafter) is fed to the braking device 5a, 5b; and a second state in which the lubricant discharged from the hydraulic pump 30 is reduced in amount to a second feed amount, which is less than the first feed amount, and is fed to the braking device 5a, 5b. When the flow-rate switching valve 31 is in a non-excited operational state, a biasing force of a spring returns the flow-rate switching valve 31 to the first state. When the flow-rate switching valve 31 is in an excited operational state, the flow-rate switching valve 31 is in the second state.

Operating Sections 32 Through 35

The variety of operating sections 32 through 35 are accommodated in an operator's cab (not shown). In being operated by an operator, they induce the work vehicle 1 to perform a variety of actions. The specifics of the operations performed by the variety of operating sections 32 through 35 are sent to the controlling section 7 in the form of an operation signal. The variety of operating sections 32 through 35 comprise, for example, a throttle operating section 32, a gear-shift operating section 33, a steering operating section 34, and a brake operating section 35.

The throttle operating section 32 is used for instructing to change engine speed. The engine speed designated by the throttle operating section 32 is inputted into the controlling section 7, which controls the engine 2 so that the engine speed matches the designated rotation speed.

The gear-shift operating section 33 is used for instructing to shift the gear position of the transmission 10. As for the work vehicle, speed stages can be shifted between first, second, and third gears in each of forward and reverse directions. When the operator operates the gear-shift operating section 33, the controlling section 7 shifts the transmission 10 to a gear position designated by the gear-shift operating section 33. The operator is thereby able to manually shift the gear position. The transmission 10 may also be shifted automatically as determined by the controlling section 7.

The steering operating section 34 is used for instructing to switch between forward and reverse movements, between a straight movement and a turn, and between turn directions of the work vehicle 1. By operating the steering operating section 34, the operator is able to switch between a state of forward movement and a state of reverse movement of the transmission 10. By operating the steering operating section 34, the operator is also able to switch between a straight movement and a turn, switch in turn direction, and adjust the speed of turn. Specifically, the controlling section 7 controls the pair of steering clutches 13a, 13b and the pair of braking devices 5a, 5b in accordance with an operation signal from the steering operating section 34, thereby switching between the aforementioned steering states. For example, the work vehicle 1 advances straight when both steering clutches 13a, 13b are engaged and both braking devices 5a, 5b are assigned to a non-braking state. When one of the clutches (steering clutch 13a) is disengaged from this state, the work vehicle 1 makes a gentle turn. When one of the clutches (steering clutch 13a) is disengaged, and the braking device 5a on the same side as the disengaged steering clutch 13a is assigned to a braking state, the vehicle makes a locked-track pivot turn. In order to turn in an opposite direction to the above, the steering clutch 13b is disengaged, and the braking device 5b is assigned to a braking state. When both steering clutches 13a, 13b are disengaged and both braking devices 5a, 5b are assigned to a braking state, the vehicle comes to a stop.

The brake operating section 35 is used for instructing the work vehicle 1 to slow down. When the brake operating section 35 is operated, the controlling section 7 controls the braking force of the braking device 5a, 5b in accordance with the degree to which the brake operating section 35 is operated. The operator is thereby able to slow or stop the vehicle by operating the brake operating section 35.

Although not shown, the work vehicle 1 has a work implement such as a blade, a hydraulic cylinder for actuating the work implement, and a hydraulic pump for the work implement in order to supply hydraulic fluid to the hydraulic cylinder, and the like. Operating a work implement operating section (not shown) allows various forms of work to be performed with the work implement.

Sensors 41 Through 43

The variety of sensors comprise, for example, an engine speed sensor 41, a bevel gear speed sensor 42, and a lubricant temperature sensor 43.

The engine speed sensor 41 detects the actual engine speed.

The bevel gear speed sensor 42 detects the rotating speed of the bevel gear 11. Because the rotating speed of the brake discs 20 of the braking device 5a, 5b is determined from the rotating speed of the bevel gear 11 detected by the bevel gear speed sensor 42, the bevel gear speed sensor 42 functions as a rotating-speed detector for detecting the rotating speed of the brake discs 20.

The lubricant temperature sensor 43 detects the temperature of the lubricant.

Information detected by the sensors 41 through 43 is inputted to the controlling section 7 as a detection signal.

Controlling Section 7

Figure 3:
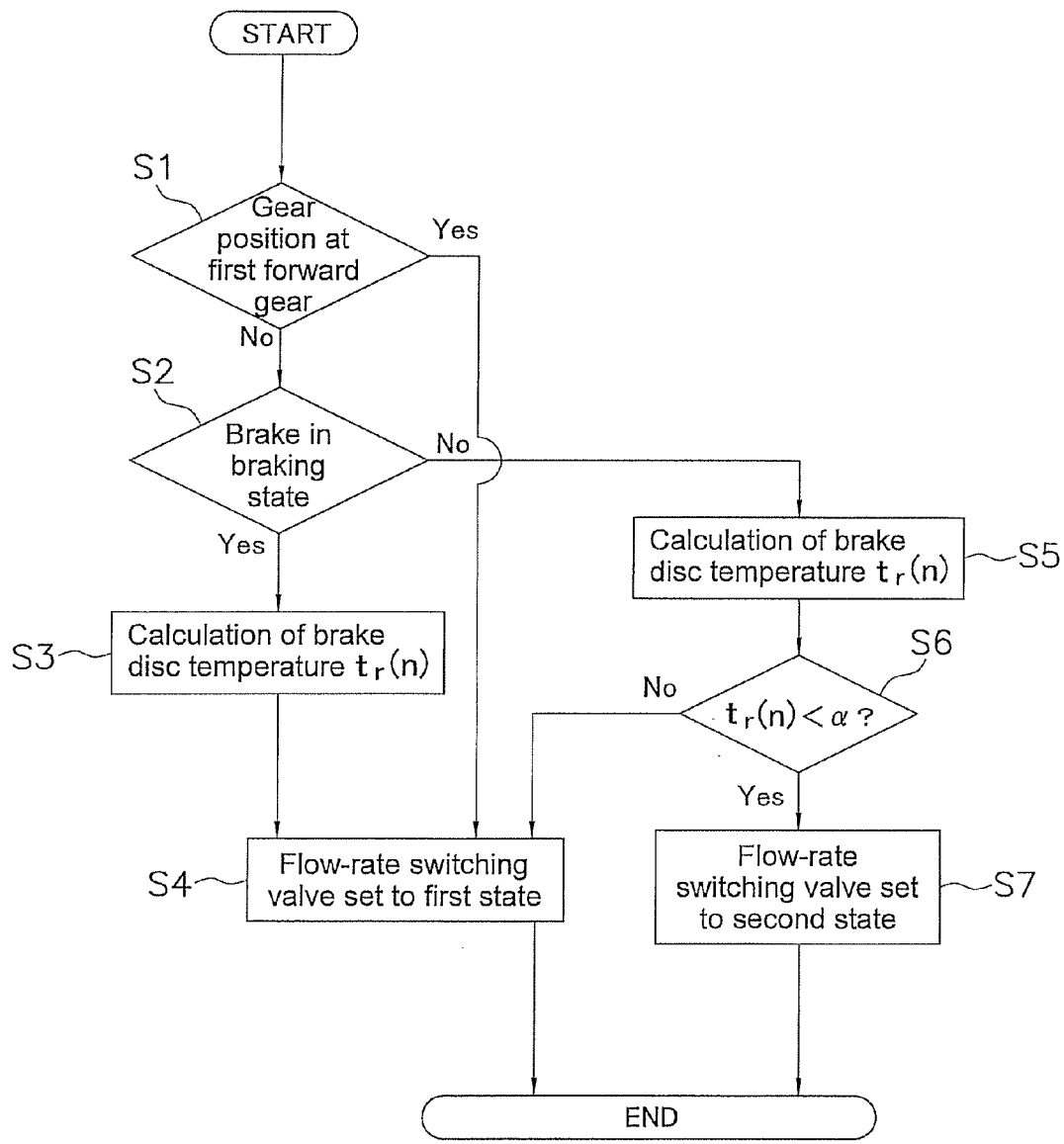
FIG. 3 is a flow chart showing a control flow of a work vehicle.
Figure 4:
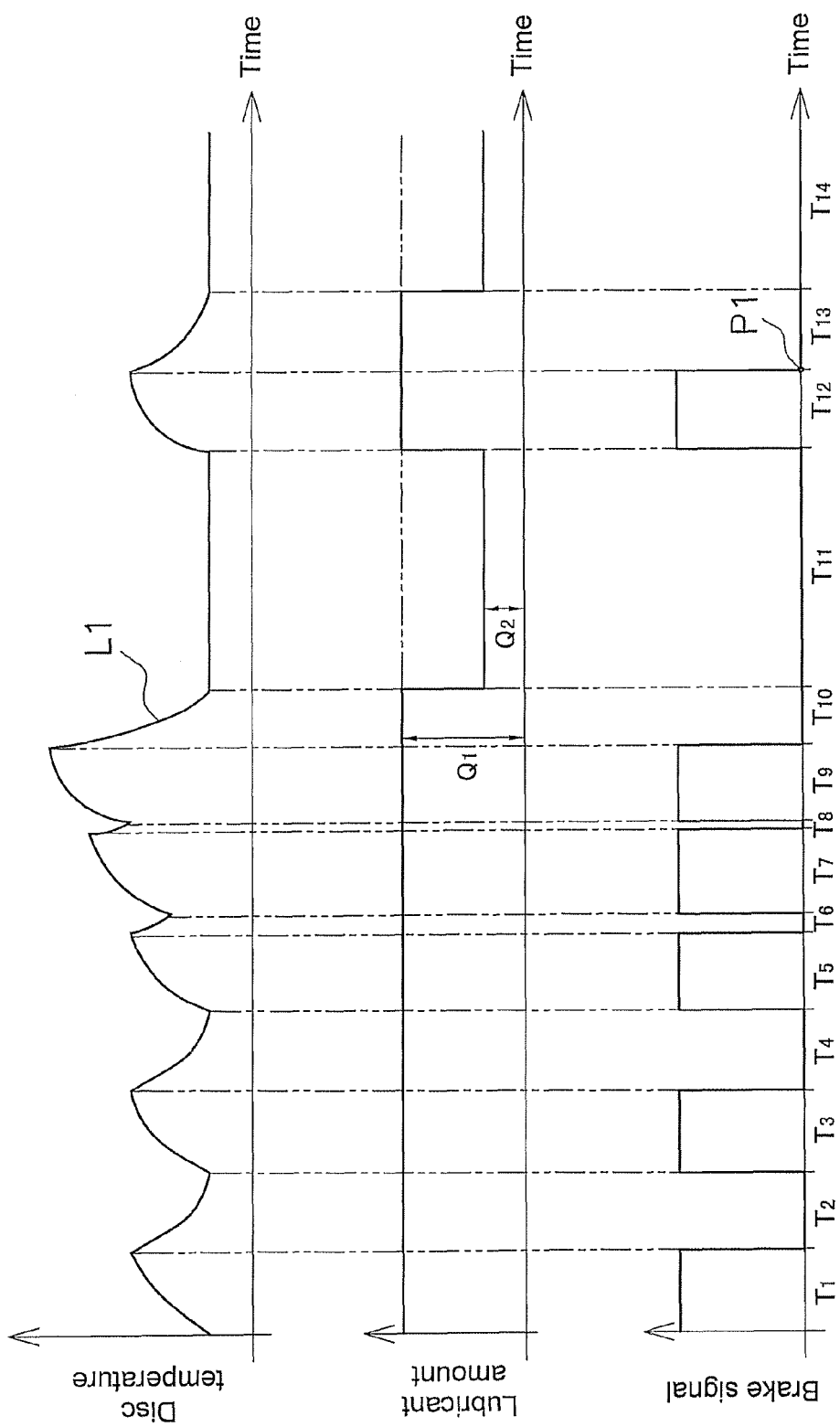
FIG. 4 is a timing diagram showing the specifics of controlling a work vehicle according to the present invention.

The controlling section 7 comprises a microcomputer, a numerical processor, or another processing unit; a memory; and the like. The controlling section 7 executes control of the engine 2, the power transmission mechanism 3, the braking device 5a, 5b, the lubricant feeding section 6, and the like in accordance with the operation signal from the variety of operating sections 32 through 35, a detection signal from the variety of sensors 41 through 43, control data stored in the controlling section 7, and other sources. The controlling section 7 is able to selectively execute the first control for controlling the amount of the lubricant fed to the braking device 5a, 5b in accordance with the temperature of the brake discs 20, or the second control in which a predetermined amount of the lubricant is fed to the braking device 5a, 5b irrespective of the temperature of the brake discs 20 and the braking/non-braking states of the braking device 5a, 5b. The control of the amount of the lubricant fed to the braking device 5a, 5b as executed by the controlling section 7 will now be described in detail with reference to a flow chart shown in FIG. 3 and a timing diagram shown in FIG. 4. The control shown in the flow chart shown in FIG. 3 is constantly executed repeatedly when the engine of the work vehicle 1 is activated.

Control of Lubricant Feed Amount

First, in a first step S1, a decision is made as to whether the gear position of the transmission 10 is the first forward gear. Here, the gear position of the transmission 10 is detected based on the operation signal sent from the gear-shift operating section 33 to the controlling section 7. If the gear position of the transmission 10 is the first forward gear, the process proceeds to a fourth step S4.

In the fourth step S4, the flow-rate switching valve 31 is assigned to the first state, and the first feed amount of lubricant is fed to the braking device 5a, 5b. When the gear position of the transmission 10 is the first forward gear, the second control is thus executed, where a predetermined amount of the lubricant is fed to the braking device 5a, 5b irrespective of the temperature of the brake disc 20 and the braking/non-braking states of the braking device 5a, 5b.

If in the first step S1, the gear position of the transmission 10 is not the first forward gear, which is a low-speed gear position; i.e., the gear position is the second or third forward gear, which are high-speed gear positions, or the first, second, or third reverse gear, the process proceeds to a second step S2.

In the second step S2, a decision is made as to whether the braking device 5a, 5b is in a braking state. When at least one of the braking devices 5a, 5b is in a braking state, the process proceeds to a third step S3.

In the third step S3, a brake disc temperature $t_r(n)$ is calculated.

Here, the brake disc temperature $t_r(n)$ is calculated as follows.

The following relationship is true:

$$\dot{q}_1 = \dot{q} - \dot{q}_2 \qquad (1)$$

where $\dot{q} = f(T, N)$ is the amount of heat generated by the brake discs 20 per unit time, $\dot{q}_2 = f(t_r(n), t_0, Q)$ is the amount of heat dissipating from the brake discs 20 per unit time, and $\dot{q}_1$ is the amount of heat stored in the brake discs 20 per unit time.

For $\dot{q}$, T is the brake torque, and is calculated from the specifications data for the brake discs 20, such as the diameter of the brake discs, the number of brake discs 20, and the friction coefficient of the brake discs 20; as well as the pressing force of the brake discs 20. The specifications data for the brake discs 20 are stored in the controlling section 7 in advance. The pressing force of the brake discs 20 is calculated according to the operation signal from the brake operating section 35 or the steering operating section 34. N represents the rotating speed of the brake discs 20, and is calculated from the rotating speed of the bevel gear 11 detected by the bevel gear speed sensor 42.

For $\dot{q}_2$, $t_r(n)$ is the temperature of the brake discs 20 calculated the nth time after the engine starts up. $t_0$ is the temperature of the lubricant. Q is the amount of supplied lubricant.

The brake disc temperature change $\Delta t_r$ is determined by dividing $\dot{q}_1$ in the equation (1) by specific heat c and integrating by time t, or:

$$\Delta t_r = \int \frac{\dot{q}_1}{c} dt$$

The initial value tr(0) of the brake disc temperature is considered to be equal to the lubricant temperature $t_0$.

The relationship $\Delta t_r > 0$ applies when the braking device 5a, 5b is in a braking state, and $\Delta t_r \leqq 0$ applies when the braking device 5a, 5b is in a non-braking state.

Thus, the brake disc temperature $t_r(n)$ is calculated, and the brake disc temperature is determined by the controlling section 7. The brake disc temperature $t_r(n)$ is used for the next calculation of the brake disc temperature $t_r(n+1)$.

Next, in the fourth step S4, the flow-rate switching valve 31 is assigned to the first state. A first feed amount Q1 of the lubricant is thereby fed to the braking device 5a, 5b as shown in periods T1, T3, T5, T7, T9, and T12 in FIG. 4. Specifically, when the braking device 5a, 5b is in a braking state, a relatively large amount of heat is generated by the brake discs 20, resulting in a large quantity of the lubricant being fed to the braking device 5a, 5b, whereby the cooling capacity of the braking device 5a, 5b is enhanced.

When both braking devices 5a, 5b are in a non-braking state in the second step S2, the process proceeds to a fifth step S5.

In the fifth step S5, the brake disc temperature $t_r(n)$ is calculated. Here, the brake disc temperature $t_r(n)$ is calculated in a manner similar to that in the third step S3.

Next, in a sixth step S6, a decision is made as to whether the brake disc temperature $t_r(n)$ calculated in the fifth step S5 is less than a predetermined target temperature α.

If the brake disc temperature $t_r(n)$ is not less than the target temperature α, the process proceeds to the fourth step S4, and the first amount of supplied lubricant is fed to the braking device 5a. Specifically, even when an operation signal from the brake operating section 35 (i.e., a braking signal) is in a switched-off state and the braking device 5a, 5b is in a non-braking state, if the brake disc temperature has not sufficiently decreased, as represented in periods T2, T4, T6, T8, T10, and T13 in FIG. 4, the lubricant is fed at the first feed amount, thereby maintaining a high cooling capacity.

If the brake disc temperature $t_r(n)$ is less than the target temperature α, the process proceeds to a seventh step S7, and the second amount of supplied lubricant is fed to the braking device 5a. Specifically, when the braking signal from the brake operating section 35 is in a switched-off state; i.e., when the braking device 5a is in a non-braking state, then if the brake disc temperature has sufficiently decreased, as represented in periods T11 and T14 in FIG. 4, the amount of supplied lubricant is decreased to the second feed amount Q2. Loss of driving force in the braking device 5a, 5b is thereby minimized.

The braking device 5a may be a negative brake instead of a positive brake as described above.

Thus, when the braking device 5a, 5b is switched from a braking state to a non-braking state, the first control, in which the amount of supplied lubricant is controlled according to the brake disc temperature, is executed in the fifth to seventh steps S5 through S7.

In the work vehicle 1, when a braking device 5a, 5b is in a braking state, a relatively large amount of the lubricant is fed to the braking device 5a, 5b, thereby maintaining high cooling capacity. Even when the braking device 5a, 5b is switched from a braking state to a non-braking state, a high cooling capacity is maintained while the brake disc temperature remains high. The amount of supplied lubricant decreases when the brake disc temperature has sufficiently decreased.

The loss of driving force in the braking device 5a, 5b can thereby be lessened to a greater extent than when the large amount of lubricant is constantly fed to the braking device 5a, 5b.

Also, in an instance in which the feed amount is increased or decreased according to the braking device 5a, 5b being switched between braking and non-braking states, the amount of supplied lubricant decreases when the braking signal is switched off, even when the temperature of the brake discs 20 has not sufficiently decreased. As a result, when the brake operating section 35 is operated intermittently and the braking device 5a, 5b switches between a braking state and a non-braking state repeatedly in a short space of time, the brake disc temperature rises as shown by a solid line L2 and overheating occurs.

Figure 5:
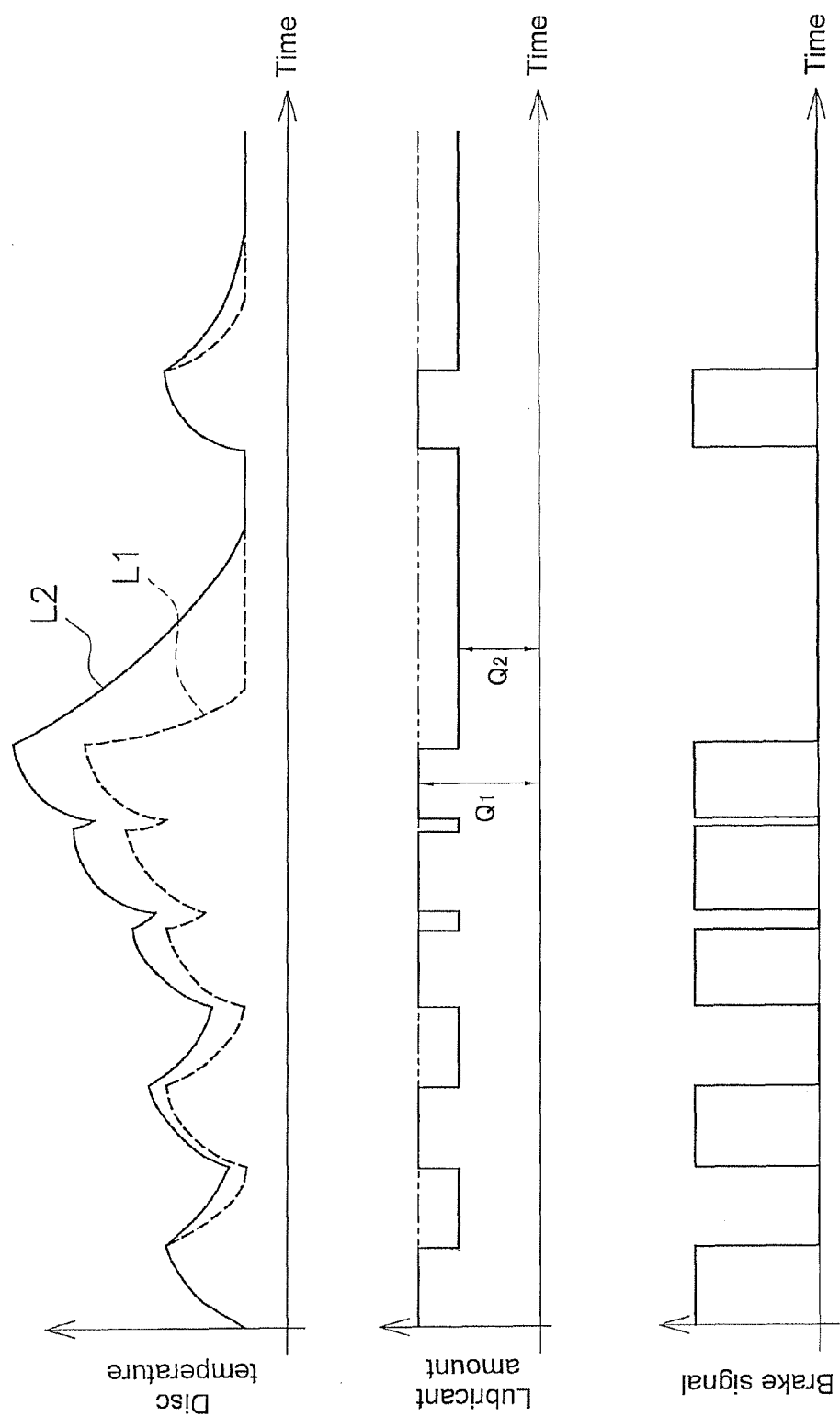
FIG. 5 is a timing diagram showing the specifics of controlling a work vehicle according to the conventional art.

By contrast, in the work vehicle 1, a high cooling capacity is maintained until the brake disc temperature has sufficiently decreased even when the braking device 5a, 5b is switched from a braking state to a non-braking state, thereby allowing the brake discs 20 to be adequately cooled (as shown by solid line L1 in FIG. 4 and dotted line L1 in FIG. 5), and allowing occurrence of overheating to be suppressed.

Also, in the work vehicle 1, the first control is made to be executable when the transmission 10 is at a high-speed gear position at which a large suppressing effect on the driving force is exhibited in the braking device 5a, 5b. The first control is not executed at a low-speed gear position at which the suppressing effect on the driving force in the braking device 5a, 5b is low. Accordingly, the cooling capacity of the braking device 5a, 5b when the transmission 10 is at a low-speed gear position can be further improved.

Since the brake discs 20 rotate at high-speed gear position, a high-durability and expensive speed sensor is necessary in instances where the brake disc temperature is measured directly using a temperature sensor. The brake disc temperature can also be determined by attaching a temperature sensor to a fixed plate 21 adjacent to a brake disc 20 and using a measured temperature of the fixed plate 21 as a substitute for the brake disc temperature, because the fixed plate 21 and the brake disc 20 are in close contact with each other when in a braking state. However, an expensive temperature sensor will still be necessary. In contrast, in the work vehicle 1, the controlling section 7 computationally determines the brake disc temperature, thereby allowing the controlling section 7 to determine the brake disc temperature using an inexpensive configuration.

Second Embodiment

In the aforementioned embodiment, a decision is made in the sixth step S6 as to whether the brake disc temperature $t_r(n)$ is smaller than a predetermined target temperature α; however, a lubricant feed time required for the brake disc temperature to decrease to a predetermined target temperature as a result of the lubricant being fed at the first feed amount may be calculated, and the amount of supplied lubricant reduced from the first feed amount to the second feed amount when the lubricant feed time has elapsed from a point in time when the braking device 5a, 5b is switched from a braking state to a non-braking state. For example, in FIG. 4, a time period corresponding to a period T13 is calculated as the lubricant feed time, and the amount of supplied lubricant is reduced from the first feed amount Q1 to the second feed amount Q2 when the lubricant feed time (T13) has elapsed from the point in time when a period T12 ends (shown by P1 in FIG. 4). In such an instance, the lubricant feed time (T13) can be calculated, for example, from the brake disc temperature $t_r(n)$ calculated in the fifth step S5 and the target temperature α, taking the lubricant temperature Tp1 at point P1 in FIG. 4 to be constant during the period T13.

In such an instance, if the braking device 5a, 5b is switched back from a non-braking state to a braking state before the lubricant feed time has elapsed from the time when the braking device is switched from a braking state to a non-braking state, the controlling section subsequently re-calculates a lubricant feed time in the first control from the point in time when a braking device 5a, 5b is switched from a braking state to a non-braking state. A suitable lubricant feed time can thereby be obtained even in an instance where the brake operating section 35 is operated intermittently.

Third Embodiment

In the aforementioned embodiment, a decision is made in the first step S1 as to whether the gear position of the transmission 10 is the first forward gear, and in an instance where the gear position of the transmission 10 is the first forward gear, the first control is not executed, and the second control is executed. However, the following decision may be made instead of, or in addition to, the aforementioned decision.

A decision may be made as to whether the rotating speed of the brake discs 20 exceeds a predetermined value, and the first control is made to be executable when the rotating speed of the brake discs 20 exceeds the predetermined value, while the second control is made to be executable when the rotating speed is equal to or less than the predetermined value.

In such an instance, the first control is made to be executable when a large suppressing effect on the driving force is exhibited in the braking device 5a, 5b; whereas the first control is not executed but the second control is executed when a suppressing effect on the driving force in the braking device 5a, 5b is low. This enables the cooling capacity of the braking device 5a, 5b to be further enhanced.

Other Embodiments (a) The method for calculating the brake disc temperature is not limited to those described above; another method may be used to calculate the brake disc temperature. For example, a method for estimating the temperature of a brake friction material described in Japanese Laid-open Patent Publication No. 11-72129 may be used.

Alternatively, the temperature of the fixed plate 21 may be determined as the brake disc temperature.

(b) In the aforementioned embodiments, the second control is executed when the gear position of the transmission 10 is a first forward gear; however, a control may be implemented so that the second control is executed during another gear. For example, the second control may be executed during the first and second forward gears. Alternatively, the first control may be executed during all gear positions. In other words, the first control is executed when at least the braking device 5a, 5b is in a non-braking state and the transmission 10 is at a high-speed gear position (for example, the third forward gear) where the rotating member rotates at a high-speed gear position, thereby allowing the loss of the driving force to be sufficiently minimized.

(c) In the aforementioned embodiments, the second feed amount is a small feed amount; however, the second feed amount may also be zero.

(d) In the aforementioned embodiments, the second control is executed when at least one of the pair of braking devices 5a, 5b is in a braking state, and the first control is made to be executable when both of the pair of braking devices 5a, 5b are in a non-braking state. However, the amount of supplied lubricant may be made changeable for each of the braking devices 5a, 5b independently, and a decision to change the supplied amount made independently.

(e) In the aforementioned embodiments, the amount of supplied lubricant is controlled so as to decrease from the first feed amount Q1 to the second feed amount Q2 in a stepwise manner; however, the amount of supplied lubricant may be controlled so as to decrease gradually.

(f) In the aforementioned embodiments, a bulldozer is given as an example of a work vehicle 1; however the present invention may be applied to other work vehicles.

The present invention is effective in minimizing loss of driving force in a braking device while also being able to suppress the incidence of overheating, and can be usefully applied to a work vehicle and to a method for controlling a work vehicle.

The invention claimed is:

1. A work vehicle comprising:
a braking device including a rotating member that rotates together with an output shaft, a fixed member fixed to a vehicle body, and a brake piston, the braking device being configured and arranged to apply hydraulic pressure to the brake piston to control a pressing state between the rotating member and the fixed member such that a braking force is generated when the rotating member is pressed against the fixed member;
a lubricant feeding section configured and arranged to feed a lubricant around the rotating member of the braking device so that the rotating member is cooled by the lubricant; and
a controlling section configured to execute a first control in which an amount of the lubricant fed to the braking device is controlled based on a temperature of the rotating member, the controlling section being further configured to set the amount of the lubricant to a predetermined first feed amount when the braking device is in a braking state in which the rotating member and the fixed member are pressed against each other, and in the first control to calculate the temperature of the rotating member and to make a decision based on the calculated temperature of the rotating member to change the amount of the lubricant from the first feed amount to a second feed amount that is smaller than the first feed amount when the braking device is switched from the braking state to a non-braking state.

2. The work vehicle according to claim 1, wherein the controlling section is configured to reduce the amount of the lubricant from the first feed amount to the second feed amount in the first control when the calculated temperature of the rotating member is lower than a predetermined target temperature.

3. The work vehicle according to claim 1, wherein the controlling section is configured to calculate a lubricant feed time required for the temperature of the rotating member to decrease to a predetermined target temperature as a result of the lubricant being fed at the first feed amount in the first control when the braking device is switched from the braking state to the non-braking state, and to reduce the amount of the lubricant from the first feed amount to the second feed amount when the lubricant feed time has elapsed from a point in time when the braking device is switched from the braking state to the non-braking state.

4. The work vehicle according to claim 3, wherein when the braking device is switched from the non-braking state to the braking state before the lubricant feed time has elapsed from the point in time when the braking device is switched from the braking state to the non-braking state, the controlling section is configured to recalculate the lubricant feed time in the first control from a subsequent point in time when the braking device is switched from the braking state to the non-braking state.

5. A work vehicle comprising:
a braking device configured and arranged to press a rotating member that rotates together with an output shaft against a fixed member fixed to a vehicle body to generate a braking force;
a lubricant feeding section configured and arranged to feed a lubricant to the braking device so that the rotating member is cooled by the lubricant;
a controlling section configured to execute a first control in which an amount of the lubricant fed to the braking device is controlled based on a temperature of the rotating member, the controlling section being further configured to set the amount of the lubricant to a predetermined first feed amount when the braking device is in a braking state in which the rotating member and the fixed member are pressed against each other, and in the first control to calculate the temperature of the rotating member and to make a decision based on the calculated temperature of the rotating member to change the amount of the lubricant from the first feed amount to a second feed amount that is smaller than the first feed amount when the braking device is switched from the braking state to a non-braking state; and
a transmission configured and arranged to convert driving force transmitted to the output shaft,
the controlling section being configured to execute the first control when the gear position of the transmission is at a predetermined high-speed gear position, and to execute a second control, in which a predetermined amount of the lubricant is fed to the braking device irrespective of the temperature of the rotating member and the braking/non-braking states of the braking device, when the gear position of the transmission is at a low-speed gear position having a greater transmission gear ratio than the high-speed gear position.

6. A work vehicle comprising:
a braking device configured and arranged to press a rotating member that rotates together with an output shaft against a fixed member fixed to a vehicle body to generate a braking force;
a lubricant feeding section configured and arranged to feed a lubricant to the braking device so that the rotating member is cooled by the lubricant;
a controlling section configured to execute a first control in which an amount of the lubricant fed to the braking device is controlled based on a temperature of the rotating member, the controlling section being further configured to set the amount of the lubricant to a predetermined first feed amount when the braking device is in a braking state in which the rotating member and the fixed member are pressed against each other, and in the first control to calculate the temperature of the rotating member and to make a decision based on the calculated temperature of the rotating member to change the amount of the lubricant from the first feed amount to a second feed amount that is smaller than the first feed amount when the braking device is switched from the braking state to a non-braking state; and
a rotating-speed detector configured and arranged to detect a rotating speed of the rotating member,
the controlling section configured to execute the first control when the rotating speed of the rotating member exceeds a predetermined value, and to execute a second control, in which a predetermined amount of the lubricant is fed to the braking device irrespective of the temperature of the rotating member and the braking/non-braking states of the braking device, when the rotating speed of the rotating member is equal to or less than the predetermined value.

7. A work vehicle comprising:
a braking device including a rotating member that rotates together with an output shaft, a fixed member fixed to a vehicle body, and a brake piston, the braking device being configured and arranged to apply hydraulic pressure to the brake piston to control a pressing state between the rotating member and the fixed member such that a braking force is generated when the rotating member is pressed against the fixed member;
a lubricant feeding section configured and arranged to feed a lubricant around the rotating member of the braking device so that the rotating member is cooled by the lubricant; and
a controlling section configured to execute a first control in which an amount of the lubricant fed to the braking device is controlled based on a temperature of the fixed member,
the controlling section being further configured to set the amount of the lubricant to a predetermined first feed amount when the braking device is in a braking state in which the rotating member and the fixed member are pressed against each other, and in the first control to calculate the temperature of the fixed member and to make a decision based on the calculated temperature of the fixed member to change the amount of the lubricant from the first feed amount to a second feed amount that is smaller than the first feed amount when the braking device is switched from the braking state to a non-braking state.

* * * * *